United States Patent
Lourenco et al.

(10) Patent No.: US 11,097,220 B2
(45) Date of Patent: Aug. 24, 2021

(54) METHOD OF PREPARING NATURAL GAS TO PRODUCE LIQUID NATURAL GAS (LNG)

(71) Applicants: 1304338 Alberta Ltd., Edmonton (CA); 1304342 Alberta Ltd., Edmonton (CA)

(72) Inventors: Jose Lourenco, Edmonton (CA); MacKenzie Millar, Edmonton (CA)

(73) Assignees: 1304338 Alberta Ltd., Edmonton (CA); 1304342 Alberta Ltd., Edmonton (CA)

( * ) Notice: Subject to any disclaimer, the term of this patent is extended or adjusted under 35 U.S.C. 154(b) by 480 days.

(21) Appl. No.: 15/761,019

(22) PCT Filed: May 19, 2016

(86) PCT No.: PCT/CA2016/050559
§ 371 (c)(1),
(2) Date: Mar. 16, 2018

(87) PCT Pub. No.: WO2017/045066
PCT Pub. Date: Mar. 23, 2017

(65) Prior Publication Data
US 2018/0265795 A1    Sep. 20, 2018

(30) Foreign Application Priority Data
Sep. 16, 2015   (WO) ................ PCT/CA2015/050896

(51) Int. Cl.
*B01D 53/14*    (2006.01)
*C10L 3/10*     (2006.01)
*F25J 3/02*     (2006.01)

(52) U.S. Cl.
CPC ..... *B01D 53/1425* (2013.01); *B01D 53/1475* (2013.01); *C10L 3/10* (2013.01);
(Continued)

(58) Field of Classification Search
CPC ...... B01D 2252/2021; B01D 2257/502; B01D 2257/80; B01D 53/1425; B01D 53/1475;
(Continued)

(56) References Cited

U.S. PATENT DOCUMENTS 2,168,438 A    8/1939   Carrier
3,002,362 A    10/1961  Morrison
(Continued)

FOREIGN PATENT DOCUMENTS

CA    1048876 A    2/1979
CA    2 422 893 A1    2/2002
(Continued)

OTHER PUBLICATIONS

Hudson, H.M., et al., "Reducing Treating Requirements for Cryogenic NGL Recovery Plants," Proceedings of the 80th Annual Convention of the Gas Processors Association, Mar. 12, 2001, San Antonio, Texas, 15 pages.
(Continued)

*Primary Examiner* — Cabrena Holecek
(74) *Attorney, Agent, or Firm* — Christensen O'Connor Johnson Kindness, PLLC

(57) ABSTRACT

A method of stripping carbon dioxide from a stream of natural gas to be used in the production of liquid natural gas (LNG) comprises the steps of: passing a stream of natural gas through a stripping column; injecting a stripping agent into the stripping column, the stripping agent stripping carbon dioxide from the stream of natural gas and exiting the stripping column as a liquid phase; passing the stripping agent exiting the stripping column through a regenerator column to generate a carbon dioxide gas stream and a recovered stripping agent stream; and cooling the recovered stripping agent stream using a cryogenic vapour generated in the production of LNG and injecting the cooled, recovered
(Continued)

stripping agent stream into the stripping column as the stripping agent.

13 Claims, 5 Drawing Sheets

(52) U.S. Cl.
CPC .............. *C10L 3/104* (2013.01); *F25J 3/0209* (2013.01); *F25J 3/0233* (2013.01); *F25J 3/0238* (2013.01); *B01D 2252/2021* (2013.01); *B01D 2257/502* (2013.01); *B01D 2257/80* (2013.01); *C10L 2290/545* (2013.01); *F25J 2200/02* (2013.01); *F25J 2200/78* (2013.01); *F25J 2205/04* (2013.01); *F25J 2205/40* (2013.01); *F25J 2205/50* (2013.01); *F25J 2210/06* (2013.01); *F25J 2215/04* (2013.01); *F25J 2220/66* (2013.01); *F25J 2220/68* (2013.01); *F25J 2230/30* (2013.01); *F25J 2240/02* (2013.01); *F25J 2240/30* (2013.01); *F25J 2270/04* (2013.01); *F25J 2270/08* (2013.01); *F25J 2270/88* (2013.01); *F25J 2290/60* (2013.01); *Y02C 20/40* (2020.08)

(58) Field of Classification Search
CPC ...... C10L 2290/545; C10L 3/10; C10L 3/104; F25J 2200/02; F25J 2200/78; F25J 2205/04; F25J 2205/40; F25J 2205/50; F25J 2210/06; F25J 2215/04; F25J 2220/66; F25J 2220/68; F25J 2230/30; F25J 2240/02; F25J 2240/30; F25J 2270/04; F25J 2270/08; F25J 2270/88; F25J 2290/60; F25J 3/0209; F25J 3/0233; F25J 3/0238; Y02C 10/04; Y02C 10/06; Y02C 20/40

See application file for complete search history.

(56) References Cited

U.S. PATENT DOCUMENTS

| | | |
|---|---|---|
| 3,152,194 A | 10/1964 | Pohl et al. |
| 3,184,926 A | 5/1965 | Blake |
| 3,241,933 A | 3/1966 | Ploum et al. |
| 3,280,575 A | 10/1966 | Drake |
| 3,315,475 A | 4/1967 | Harmens |
| 3,367,122 A | 2/1968 | Tutton |
| 3,653,220 A | 4/1972 | Foster et al. |
| 3,735,600 A | 5/1973 | Dowdell et al. |
| 3,747,359 A | 7/1973 | Streich |
| 3,754,405 A | 8/1973 | Rosen |
| 3,792,590 A | 2/1974 | Lofredo et al. |
| 3,846,993 A | 11/1974 | Bates |
| 3,859,811 A | 1/1975 | Duncan |
| 3,892,103 A | 7/1975 | Antonelli |
| 3,919,853 A | 11/1975 | Rojey |
| 3,962,881 A | 6/1976 | Muska |
| 4,033,735 A | 7/1977 | Swenson |
| 4,041,724 A | 8/1977 | Gustafsson |
| 4,170,115 A | 10/1979 | Ooka et al. |
| 4,279,130 A | 7/1981 | Finch et al. |
| 4,418,530 A | 12/1983 | Bodrov et al. |
| 4,424,680 A | 1/1984 | Rothchild |
| 4,430,103 A | 2/1984 | Gray et al. |
| 4,444,577 A | 4/1984 | Perez |
| 4,617,039 A | 10/1986 | Buck |
| 4,681,612 A | 7/1987 | O'Brien et al. |
| 4,710,214 A | 12/1987 | Sharma et al. |
| 4,751,151 A | 6/1988 | Healy et al. |
| 4,869,740 A | 9/1989 | Campbell et al. |
| 4,907,405 A | 3/1990 | Polizzotto |
| 4,936,888 A | 6/1990 | DeLong |
| 5,026,952 A | 6/1991 | Bauer |
| 5,062,270 A | 11/1991 | Haut et al. |
| 5,137,558 A | 8/1992 | Agrawal |
| 5,295,350 A | 3/1994 | Child et al. |
| 5,329,774 A | 7/1994 | Tanguay et al. |
| 5,425,230 A | 6/1995 | Shpak |
| 5,440,894 A | 8/1995 | Schaeffer et al. |
| 5,560,212 A | 10/1996 | Hansen |
| 5,678,411 A | 10/1997 | Matsumura et al. |
| 5,685,170 A | 11/1997 | Sorensen |
| 5,743,110 A | 4/1998 | Laude-Bousquet |
| 5,782,958 A * | 7/1998 | Rojey ............... C10L 3/102 95/192 |
| 5,799,505 A | 9/1998 | Bonaquist et al. |
| 5,953,935 A | 9/1999 | Sorensen |
| 5,956,971 A | 9/1999 | Cole et al. |
| 5,983,663 A | 11/1999 | Sterner |
| 6,089,022 A | 7/2000 | Zednik et al. |
| 6,089,028 A | 7/2000 | Bowen et al. |
| 6,131,407 A | 10/2000 | Wissolik |
| 6,138,473 A | 10/2000 | Boyer-Vidal |
| 6,182,469 B1 | 2/2001 | Campbell et al. |
| 6,266,968 B1 | 7/2001 | Redlich |
| 6,286,315 B1 | 9/2001 | Staehle |
| 6,378,330 B1 | 4/2002 | Minta et al. |
| 6,401,486 B1 | 6/2002 | Lee et al. |
| 6,432,565 B1 | 8/2002 | Haines |
| 6,517,286 B1 | 2/2003 | Latchem |
| 6,526,777 B1 | 3/2003 | Campbell et al. |
| 6,581,409 B2 | 6/2003 | Wilding et al. |
| 6,606,860 B2 | 8/2003 | McFarland |
| 6,640,555 B2 | 11/2003 | Cashin |
| 6,662,589 B1 | 12/2003 | Roberts et al. |
| 6,694,774 B1 | 2/2004 | Rashad et al. |
| 6,739,140 B2 | 5/2004 | Bishop et al. |
| 6,751,985 B2 | 6/2004 | Kimble et al. |
| 6,889,523 B2 | 5/2005 | Wilkinson et al. |
| 6,932,121 B1 | 8/2005 | Shivers, III |
| 6,945,049 B2 | 9/2005 | Madsen |
| 7,051,553 B2 | 5/2006 | Mak et al. |
| 7,107,788 B2 | 9/2006 | Patel et al. |
| 7,155,917 B2 | 1/2007 | Baudat |
| 7,219,502 B2 | 5/2007 | Nierenberg |
| 7,257,966 B2 | 8/2007 | Lee et al. |
| 7,377,127 B2 | 5/2008 | Mak |
| 8,429,932 B2 | 4/2013 | Lourenco et al. |
| 8,640,494 B2 | 2/2014 | Lourenco et al. |
| 8,850,849 B2 | 10/2014 | Martinez et al. |
| 8,887,513 B2 | 11/2014 | Kotzot et al. |
| 2002/0170297 A1 | 11/2002 | Quine et al. |
| 2003/0008605 A1 | 1/2003 | Hartford, Jr. et al. |
| 2003/0019219 A1 | 1/2003 | Viegas et al. |
| 2003/0051875 A1 | 3/2003 | Wilson |
| 2003/0182947 A1 | 10/2003 | Kimble et al. |
| 2003/0196452 A1 | 10/2003 | Wilding et al. |
| 2004/0065085 A1 | 4/2004 | Madsen |
| 2005/0086974 A1 | 4/2005 | Steinbach et al. |
| 2005/0244277 A1 | 11/2005 | Hurst, Jr. et al. |
| 2006/0213222 A1 | 9/2006 | Whitesell |
| 2006/0213223 A1 | 9/2006 | Wilding et al. |
| 2006/0242970 A1 | 11/2006 | Yang et al. |
| 2006/0260355 A1 | 11/2006 | Roberts et al. |
| 2007/0062216 A1 | 3/2007 | Mak et al. |
| 2007/0107465 A1 | 5/2007 | Turner et al. |
| 2008/0016910 A1 | 1/2008 | Brostow et al. |
| 2009/0084132 A1 | 4/2009 | Dragomir et al. |
| 2009/0113928 A1 | 5/2009 | Vandor et al. |
| 2009/0194460 A1 | 8/2009 | Klein Nagul Voort et al. |
| 2009/0194461 A1 | 9/2009 | Bras et al. |
| 2009/0249829 A1 | 10/2009 | Lourenco et al. |
| 2009/0282863 A1 | 11/2009 | Lourenco et al. |
| 2009/0282865 A1 | 11/2009 | Martinez et al. |
| 2010/0000234 A1 | 1/2010 | Bras et al. |
| 2010/0242499 A1 | 9/2010 | Lourenco et al. |
| 2010/0287985 A1 | 11/2010 | Martinez et al. |
| 2011/0036122 A1 | 2/2011 | Betting et al. |
| 2011/0067441 A1 | 3/2011 | Martinez et al. |
| 2011/0094263 A1 | 4/2011 | Wilding et al. |
| 2011/0174017 A1 | 7/2011 | Victory et al. |

(56) References Cited

U.S. PATENT DOCUMENTS

| | | |
|---|---|---|
| 2012/0036888 A1 | 2/2012 | Vandor |
| 2012/0060554 A1 | 3/2012 | Schmidt |
| 2012/0096896 A1 | 4/2012 | Patel et al. |
| 2012/0169049 A1 | 7/2012 | Oxner et al. |
| 2012/0255325 A1 | 10/2012 | Prim |
| 2013/0333416 A1 | 12/2013 | Lourenco et al. |
| 2015/0016952 A1 | 1/2015 | Oxner |
| 2015/0143842 A1 | 5/2015 | Lourenco et al. |

FOREIGN PATENT DOCUMENTS

| | | | |
|---|---|---|---|
| CA | 2 467 338 A1 | 7/2003 | |
| CA | 2 516 785 A1 | 9/2004 | |
| CA | 2 552 366 A1 | 7/2005 | |
| CA | 2 299 695 A1 | 7/2007 | |
| CA | 2 536 075 C | 7/2007 | |
| CA | 2 318 802 A1 | 2/2008 | |
| CA | 2 777 760 A1 | 5/2011 | |
| CA | 2 728 716 A1 | 7/2012 | |
| CA | 2 515 999 A1 | 12/2012 | |
| CA | 2 763 081 A1 | 6/2013 | |
| CA | 2813260 A1 * | 10/2014 | ............. F25J 3/0233 |
| CN | 1615415 A | 5/2005 | |
| CN | 101948706 A | 1/2011 | |
| DE | 44 16 359 A1 | 11/1995 | |
| EP | 0 482 222 A1 | 4/1992 | |
| EP | 0 566 285 A1 | 10/1993 | |
| EP | 0 635 673 A1 | 1/1995 | |
| EP | 0 780 649 A1 | 6/1997 | |
| FR | 2 420 081 A1 | 10/1979 | |
| GB | 1011453 | 12/1965 | |
| GB | 2 103 354 A | 2/1983 | |
| JP | 3-236589 A | 10/1991 | |
| JP | 5-263998 A | 10/1993 | |
| JP | 2002-295799 A | 10/2002 | |
| JP | 2003-165707 A | 6/2003 | |
| RU | 2 180 420 C2 | 3/2002 | |
| RU | 2 232 342 C1 | 7/2004 | |
| WO | 94/11626 A1 | 5/1994 | |
| WO | 97/01069 A1 | 1/1997 | |
| WO | 98/59205 A2 | 12/1998 | |
| WO | 99/31447 A3 | 6/1999 | |
| WO | 00/52403 A1 | 9/2000 | |
| WO | 03/081038 A1 | 10/2003 | |
| WO | 03/095913 A1 | 11/2003 | |
| WO | 03/095914 A1 | 11/2003 | |
| WO | 2004/010480 A1 | 1/2004 | |
| WO | 2004/052511 A1 | 6/2004 | |
| WO | 2004/109180 A1 | 12/2004 | |
| WO | 2004/109206 A1 | 12/2004 | |
| WO | 2005/045337 A1 | 5/2005 | |
| WO | 2006/004723 A1 | 1/2006 | |
| WO | 2006/019900 A1 | 2/2006 | |
| WO | 2006/036441 A1 | 4/2006 | |
| WO | 2008/006221 A1 | 1/2008 | |
| WO | 2009/061777 A1 | 5/2009 | |
| WO | 2012/015554 A1 | 2/2012 | |
| WO | 2014/032179 A1 | 3/2014 | |

OTHER PUBLICATIONS

Kidnay, A.J., and W.H. Parrish, "Fundamentals of Natural Gas Processing," Taylor & Francis Group, Abingdon, U.K., © 2006, 440 pages.

International Search Report and Written Opinion dated Jul. 18, 2014, issued in corresponding International Application No. PCT/CA2014/050374, filed Apr. 14, 2014, 9 pages.

International Search Report and Written Opinion dated May 1, 2012, issued in corresponding International Application No. PCT/CA2012/050030, filed Jan. 18, 2012, 9 pages.

International Search Report and Written Opinion dated Oct. 24, 2013, issued in corresponding International Application No. PCT/CA2013/050639, filed Aug. 19, 2013, 7 pages.

International Search Report and Written Opinion dated Aug. 2, 2013, issued in corresponding International Application No. PCT/CA2013/050363, filed May 10, 2013, 9 pages.

International Search Report and Written Opinion dated Jun. 7, 2016, issued in corresponding International Application No. PCT/CA2015/050896, filed Sep. 16, 2015, 6 pages.

International Search Report and Written Opinion dated Aug. 30, 2016, issued in corresponding International Application No. PCT/CA2016/050559, filed May 19, 2016, 7 pages.

* cited by examiner

METHOD OF PREPARING NATURAL GAS TO PRODUCE LIQUID NATURAL GAS (LNG)

FIELD

This relates to a method that prepares natural gas for the production of LNG, such as at a gas pressure reduction station or straddle plant.

BACKGROUND

Pressure reduction stations are located along main transmission high pressure natural gas pipelines for gas distribution to regional pipelines. The purpose of a pressure reduction station is to control flow and pressure of natural gas to regional distribution pipelines. When the gas pressure is reduced, the temperature is also reduced, this is known as the Joules-Thompson effect. The degree of temperature reduction is dependent on the pressure differentials and the equipment used to reduce the pressure. When the equipment employed is a pressure reduction valve the temperature reduction is about 0.5° C. for every 1 atmosphere pressure change. When the equipment employed is a gas expander turbine the temperature reduction is up to 2° C. for every 1 atmosphere pressure change. This reduction in gas temperature can generate hydrates due to water content in the natural gas stream, to prevent the formation of hydrates the gas requires to be conditioned before the pressure is reduced.

The common practice at existing pressure reduction stations is to use pressure reduction valves, because it results in a lower temperature reduction. To condition the gas and prevent the formation of hydrates, before the pressure is reduced the gas is pre-heated to a temperature that ensures the gas is above 0° C. after pressure reduction.

The typical pressure reduction at these stations, can consume up to 1.5% of its gas flow throughput to regional distribution pipelines to pre-heat the gas and prevent the formation of hydrates.

Straddle plants may also be present on the gas distribution system, which are used to extract ethane and heavier natural gas liquids from natural gas in the gas transmission pipeline.

The production of LNG is typically done in large plants located in areas where gas transmission pipelines are not available and or economical. LNG provides gas producers with an alternative to pipeline transport by shipping at as a liquid to a port. The gas processes to prepare and produce LNG at these large plants require a substantial energy input, its main objective is to transport it to a port where it is re-gasified and transported by high pressure transmission pipelines in a gaseous phase to markets. Recently, the gas industry started promoting the use of LNG as an alternative fuel to diesel, mainly to the trucking industry. The main challenge to the industry is the lack of infra-structure to produce, store and distribute LNG to consumers. The present main supply of LNG is typically delivered in very large quantities to ports, these can be far away from markets resulting in high distribution costs.

A major challenge in the economic production of LNG is the removal of carbon dioxide to meet LNG product specifications. In some proprietary processes, methanol is used as a solvent Other processes may be based on Rectisol, developed by Lurgi and Ifpexol developed by IFP. The Rectisol process is employed primarily in the purification of synthesis to selectively remove hydrogen sulfide, the typical operating temperatures are between −40 and −60° C. The Ifpexol process is used in natural gas treating applications, to remove water and hydrocarbons in stage 1 and acid gases is stage 2, the typical operating temperatures are −20 to −40° C. In both cases the use of these processes in the industry are limited due to its high capital and operating costs to meet methanol refrigeration needs for the process.

The promotion for use of LNG as a replacement to diesel resulted in the development of mini LNG plants that use external sources of refrigeration such as liquid nitrogen or refrigeration compression cycles. The typical gas pre-treatment is done by use of molecular sieves to remove water and carbon dioxide. Molecular sieves are a proven commercial process, but they are expensive in capital and operating costs.

SUMMARY

There is provided a method of stripping carbon dioxide from a stream of natural gas to be used in the production of liquid natural gas (LNG), the stream of natural gas comprising at least methane and carbon dioxide. The method may comprise the steps of: passing a stream of natural gas through a stripping column; injecting a stripping agent into the stripping column, the stripping agent stripping carbon dioxide from the stream of natural gas and exiting the stripping column as a liquid phase; passing the stripping agent exiting the stripping column through a regenerator column to generate a carbon dioxide gas stream and a recovered stripping agent stream; and cooling the recovered stripping agent stream using a cryogenic vapour generated in the production of LNG and injecting the cooled, recovered stripping agent stream into the stripping column as the stripping agent.

According to other aspects, the method may comprise one or more of the following aspects, alone or in combination: the stripping agent may comprise methanol; the method may further comprise the step of passing the stripping agent and the recovered stripping agent stream through one or more heat exchangers for recovering coolth between the stripping column and the regenerator column; the method may further comprise the step of heating the stripping agent exiting the stripping column prior to entering the regenerator column to a temperature above the boiling point of carbon dioxide and below the boiling point of the stripping agent the method may further comprise the step of controlling a temperature within the regenerator column by circulating a portion of the recovered stripping agent stream through a heater loop that heats and returns the portion of the recovered stripping agent stream to the regenerator column; the heater loop may recover heat from a compressed natural gas stream exiting a natural gas compressor the method may further comprise the step of reducing the pressure of the stripping agent exiting the stripping column prior to entering the regenerator column; and the stripping agent may additionally strips hydrogen sulphide from the natural gas stream.

According to another aspect, there is provided a method of generating liquid natural gas from a stream of natural gas, comprising the steps of stripping carbon dioxide from the stream of natural gas using the method described above, and reducing the temperature and pressure of at least a portion of the stream of stripped natural gas to within the liquid phase. The stream of natural gas may be a slipstream of a primary natural gas stream that has been diverted from a transmission pipeline for additional processing in a plant and pre-cooled in a heat exchanger. The plant may be a pressure let down station and the additional processing may comprise reducing the pressure of the primary natural gas stream to meet specifications of a downstream distribution pipeline.

The plant may be a straddle plant and the additional processing and may comprise removing natural gas liquids from the primary natural gas stream in a distillation tower.

Other objects and aspects will be apparent from the description below and drawings. It will be understood that different examples beyond those described herein may be arrived at by combining the variously described elements in any reasonable manner.

BRIEF DESCRIPTION OF THE DRAWINGS

These and other features will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

The method will now be described with reference to FIG. 1 through 5.

In the presently described method, the refrigeration energy is provided by the recovery of pressure energy currently wasted at pressure reduction stations. The recovered energy also allows methanol to be refrigerated at much colder temperatures and hence at higher efficiencies. For example, in the presently described method, the average refrigerated methanol temperature is −80° C.

The present method was developed with a view to prepare a natural gas stream to produce LNG at gas pressure reduction stations. The method uses the methane expansion cycle in a different manner, which to date is used in commercial applications known as pressure reduction stations. The system here described takes advantage of the gas streams delivered to regional distribution pipelines at pressure reduction stations to provide an improved method of producing LNG at gas pressure reduction stations. In one example, this method pre-treats and removes water and carbon dioxide and uses methanol that is refrigerated by energy recovered from transmission pipeline pressure available at the pressure reduction station inlet. The method produces and recovers transmission pipeline pressure energy at gas pressure reduction stations to refrigerate a methanol stream and use it as a carbon dioxide stripping agent in a stripping column. In the description that follows.

Figure 1:
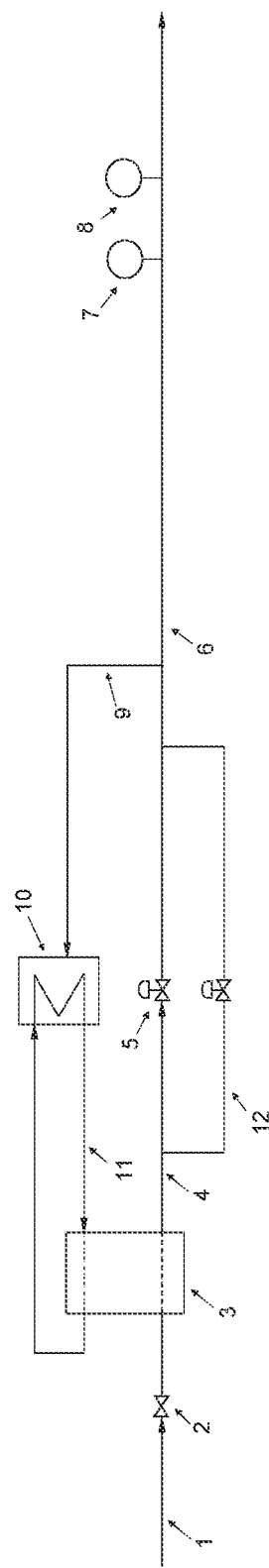
FIG. 1 is a schematic diagram of a typical pressure reduction station equipped with JT valves for controlled pressure reduction to a regional distribution pipeline, a glycol/water heater and a glycol/water, gas heat exchanger.

Referring to FIG. 1, a typical gas pressure reduction station of a natural gas main transmission pipeline is shown. Once the principles of operation are understood, it will be understood by those skilled in the art that variations are possible using known pressure and temperature equipment. Natural gas is delivered from a high pressure main transmission pipeline as natural gas stream 1, which enters pressure the pressure reduction station through block valve 2 and is pre-heated in heat exchanger 3. The pre-heated gas stream 4 pressure, is reduced through a JT valve 5 to regional distribution pipeline 6 pressure. The regional distribution pipeline 6 pressure is maintained by pressure transmitter 7 which controls JT valve 5 natural gas flow. A closed recycling loop glycol/water 11 transfers the heat from heater 10 to gas heat exchanger 3 to pre-heat the gas. A temperature transmitter 8 monitors and controls the regional gas distribution pipeline temperature by controlling the gas flow stream 9 to a glycol/water heater 10. A closed loop recycling glycol/water 11 transfers the heat from heater 10 to gas heat exchanger 3 to pre-heat the inlet gas stream to the pressure reduction station. This simplified process arrangement as shown is FIG. 1 constitutes a standard operation at gas pressure reduction stations. The purpose of pre-heating the gas before decreasing the pressure at the pressure reduction station is to prevent the formation of hydrates due to the presence of water in the gas composition.

Figure 2:
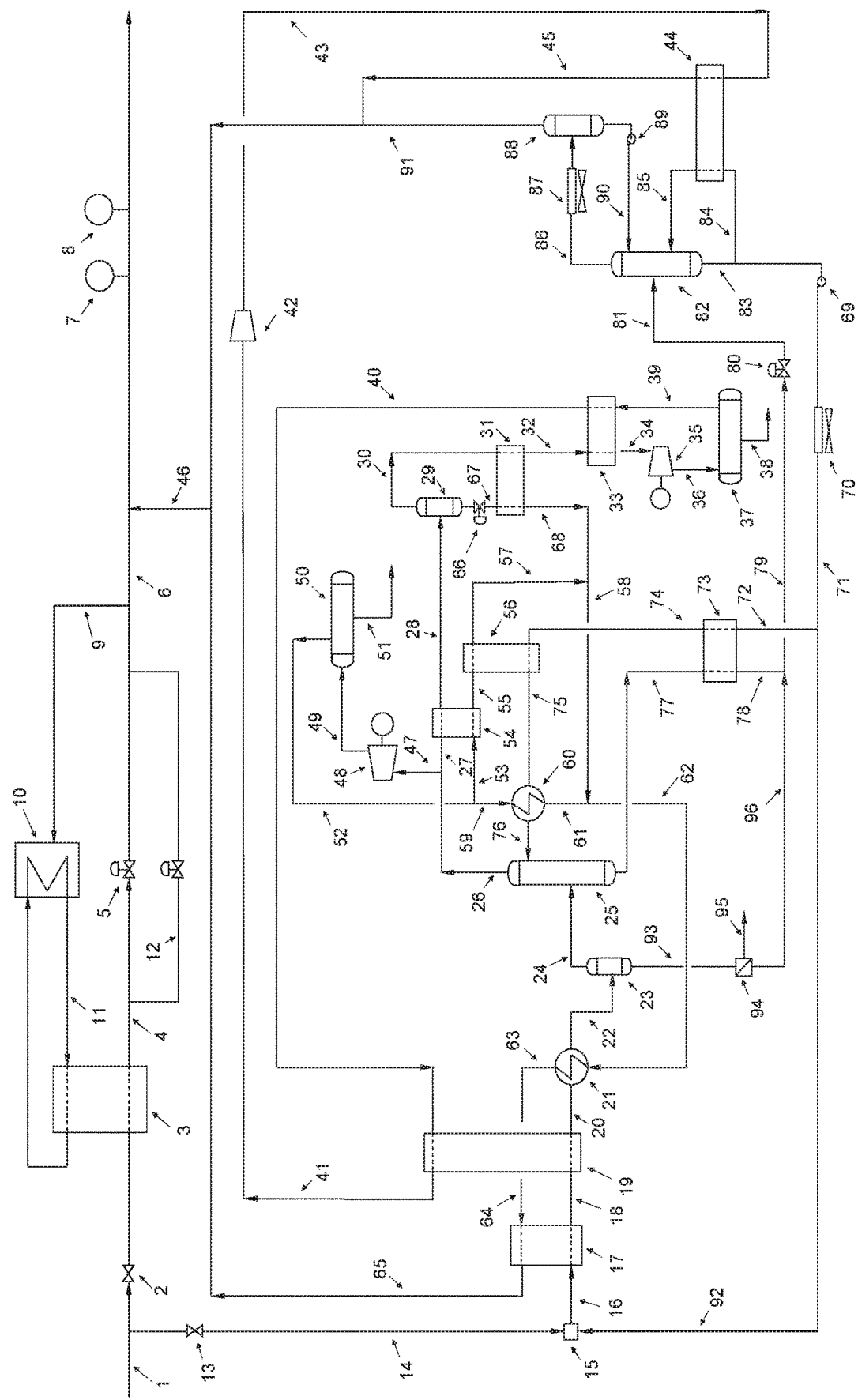
FIG. 2 is a schematic diagram of a LNG production process added to an existing gas pressure letdown station and equipped with; gas pre-treatment units, heat exchangers, a stripping column, gas expanders, KO drums, pumps and LNG storage. The process natural gas stream is supplied from high pressure natural gas transmission pipeline.
Figure 3:
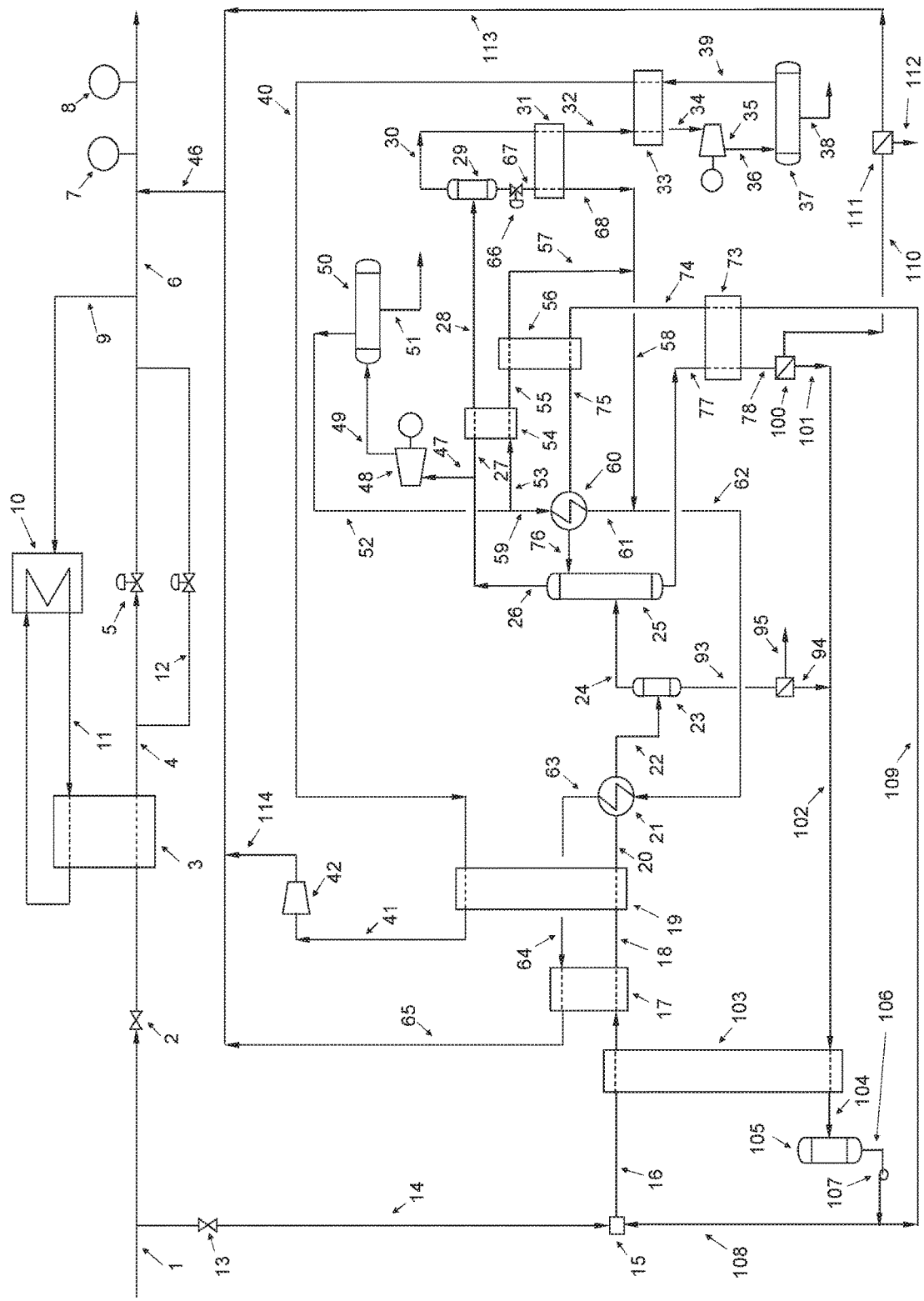
FIG. 3 is a schematic diagram of an alternate LNG production process.

Referring to FIG. 2, the process is shown as being operated in parallel at an existing pressure reduction station. As depicted, stream 1 is routed to the LNG production plant by closing pressure reduction block valve 2 and opening valve 13. The natural gas stream 14 passes through in-line mixer 15 where a methanol stream 92 is added as a hydrate inhibitor to keep the water content of the gas in a liquid solution. The hydrate inhibited stream 16 is first pre-cooled in heat exchanger 17, and further cooled in heat exchangers 19 and 21, the colder gas stream 22 enters gas/liquid separator 23 where the water and methanol is removed through stream 93. The vapour fraction 24 is routed to carbon dioxide stripping column 25 and flows upward in direct contact and in a counter current flow with refrigerated methanol from stream 76. The carbon dioxide stripping column internals can be bubble tray or packing bed contact tower. The refrigerated methanol strips the carbon dioxide fraction from the gas and carries it to the bottom of the column and exits through stream 77 for regeneration. The natural gas now stripped of carbon dioxide exits column 25 through overhead stream 26.

A large portion of pre-treated gas stream 26 is routed through stream 47 to a pressure reducing gas expander/generator 48, where the discharged pressure is controlled by regional gas distribution pipeline pressure, connector gas stream 46. The pressure reduction across gas expander/generator 48 produces electrical energy and reduces stream 49 temperature due to the Joules Thompson effect. The colder gas stream 49 enters separator 50 where the condensate fraction 51 is removed as natural gas liquids. The gaseous stream 52 is the main refrigeration stream for the process.

The pre-treated gaseous stream 27 is further cooled in heat exchanger 54, and the resultant cooler gas stream 28 enters separator 29 for condensate removal. The objective of heat exchanger 54 followed by separator 29 is to control the composition of natural gas stream 30 to meet LNG product specifications. The leaner gas stream 30 is further cooled in heat exchangers 31 and 33 before reducing its pressure through a second gas expander/generator 35, producing more electrical energy. The pressure reduced stream 36 enters separator 37 where liquid natural gas is separated and routed through stream 38 to storage. The cryogenic gaseous stream 39 is routed through lines 39 and 40 to heat exchangers 33 and 19 to recover its cryogenic energy, and routed to compressor 42 through gas stream 41. The compressed and heated gas stream 43 is routed through heat exchanger 44, where it gives up its compression heat and routed through stream 45 to regional distribution gas pipeline connector stream 46.

The natural gas refrigeration stream 53 is flow controlled through heat exchanger 54 to provide cooling requirements for condensation of heavier fractions in stream 28, thus controlling gas stream composition of stream 30. The natural gas refrigeration stream 55 exits heat exchanger 54 and provides further refrigeration at heat exchanger 56, exiting as stream 57 and, for further refrigeration, mixing with stream 68 into stream 58, and further mixing with stream 61 into stream 62.

The natural gas refrigeration stream 59 is muted through heat exchanger 60 to control the temperature of refrigerated methanol stream 76 entering carbon dioxide stripping column 25. The refrigerated stream 61 exits heat exchanger 60 and mixes with natural gas refrigeration streams 57 and 68, via stream 58, forming natural gas refrigeration stream 62. The natural gas refrigeration stream 62 enters heat exchanger 21, followed by heat exchanger 17 via lines 63 and 64 giving up its remaining refrigeration energy to natural gas stream 14 entering the pressure reduction station. The heat recovery gas stream 65 is routed to the regional gas distribution pipeline 6, through connector stream 46. This heat exchange arrangement eliminates the present practice of pre-heating natural gas at pressure reduction stations by gas combustion.

The regenerated methanol stream 83 is routed to pump 69 and pre-cooled by an ambient air fin fan heat exchanger 70. The regenerated pre-cooled methanol stream 71 is split into streams 72 and 92. The regenerated methanol stream 72 is further cooled in heat exchangers 73, 56 and 60, via streams 72, 74 and 75, before entering the top tray of carbon dioxide stripping column 25 via stream 76. The refrigerated methanol flows downward the column in a counter-current flow with natural gas, stripping the carbon dioxide fraction from the natural gas stream and exiting at the bottom of the column as a rich methanol stream 77, through heat exchanger 73 to pre-cool the regenerated methanol. The preheated rich methanol stream 78 mixes with rich methanol stream 96 into methanol rich stream 79, through pressure reduction valve 80 and through stream 81 into methanol regeneration column 82. A reboiler stream 84 is heated by heat exchanger 44 to vaporize the carbon dioxide from the methanol into stream 85. The methanol regeneration column overhead stream 86 from column 82 is pre-cooled by an ambient air fin fan heat exchanger 87 before entering separator 88. A reflux stream 90 is routed through pump 89 to control the overhead temperature of column 82. The vapour stream 91 exits methanol regeneration column 88 and is routed to the regional gas distribution pipeline 6 through connector stream 46. A regenerated methanol stream 92 is routed to gas mixer 15 at a controlled dosage as a hydrate inhibitor. The hydrate inhibitor methanol stream fraction of stream 22 along with the water in the natural gas stream is condensed and recovered at separator 23. The condensed mixture leaves separator 23 through stream 93 into a solvent membrane 94 where water stream is removed through stream 95, the recovered methanol is routed through line 96 into methanol regeneration column 82.

In the depicted example, the process uses the pressure energy in the pressure reduction gas inlet stream to generate a refrigeration stream that is used to refrigerate a methanol stream to absorb and remove carbon dioxide in a $CO_2$ stripping column at gas pressure reduction stations. The use of expanders/generators in pressure reduction processes to generate the Joule Thompson effect is well understood and in practice in the gas industry in various forms. An advantage of the proposed process is the configuration that the recovery of pressure energy in the inlet gas stream to generate a refrigeration gas stream to refrigerate a methanol to strip carbon dioxide in a stripping column at pressure reduction stations.

As will be understood, the embodiment in FIG. 2 is an example, and there are alternative designs that may be used to accomplish similar results. For example, FIG. 3 uses membrane separators 100 and 111 instead of expansion valve 80, separation tanks 82 and 88, and other equipment as described above with respect to FIG. 2 to separate methanol into streams 101 and 112, and carbon dioxide into streams 110 and 113. Those skilled in the art will understand that other equipment may be used to accomplish similar results to those described herein.

Typically pressure reduction stations operate as show in FIG. 1, requiring the use of a portion of the gas flow (generally about 1% of the total inlet gas flow to the pressure reduction station) to pre-heat the gas and prevent the formation of hydrates. When using the process, the need for combusting gas for gas pre-heating and the need to use the industry standard mol sieve technology at a pressure reductions station for the removal of $CO_2$ from a natural gas stream to produce LNG may be reduced or eliminated.

While the description to this point has discussed a natural gas stream in a gas pressure reduction station, the process may also be used at a straddle plants, or a natural gas liquids recovery plant. Canadian Patent Application No. 2,763,081 (Lourenco et al.), entitled "Method to Produce Liquefied Natural Gas (LNG) at Midstream Natural Gas Liquids (NGLs) Recovery Plants", describes a process addition to straddle plants that are used to recover natural gas liquids (NGLs). The described process allows these Straddle plants, in addition to producing NGL's, to also efficiently produce liquid natural gas (LNG).

Figure 4:
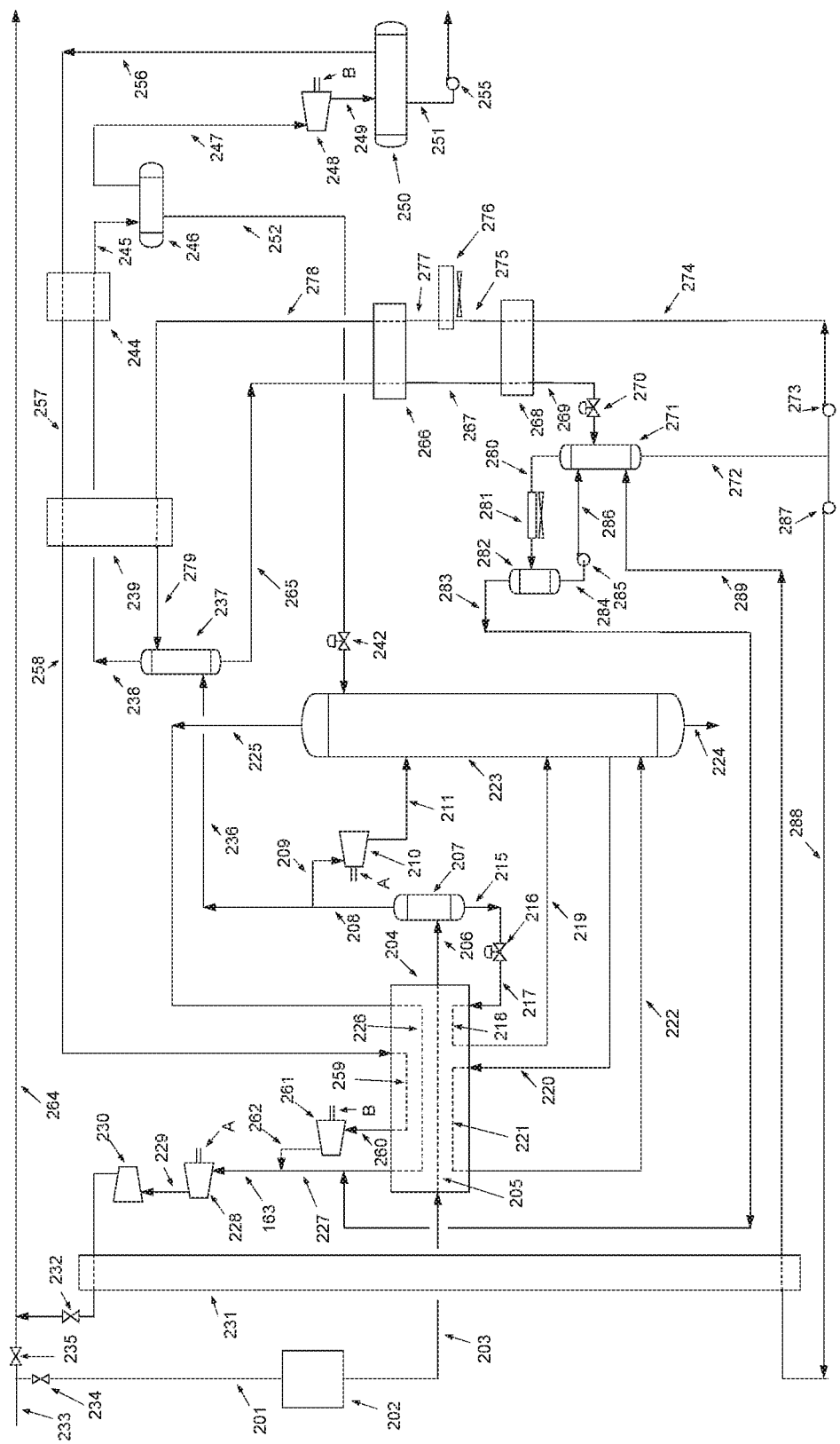
FIG. 4 is a schematic diagram of a typical straddle pant. A LNG production unit is added to an existing Straddle plant equipped with the proposed method to of $CO_2$ removal to meet LNG product specifications.

Referring to FIG. 4, an example of how the process discussed above may be applied to a straddle plant. In the depicted example, a pressurized pipeline natural gas stream 233 is routed to a straddle plant through valve 234. Valve 235, allows the transmission gas pipeline to bypass the straddle plant. High pressure gas stream 201 enters the straddle plant and is first pre-treated in unit 202 to remove the water content. The de-watered stream 203 is then routed to cold box 204 where it is pre-cooled in coil 205 by counter current gas streams is series, first by gas coil 221, then gas coil 259, gas coil 226 and finally gas coil 218. The high pressure, pre-cooled gas stream 206 enters separator 207 where the liquids and gaseous fractions are separated. The liquid fraction is routed through stream 215 to expansion valve 216, where the pressure is reduced to column 223 pressure. This pressure expansion generates more coolth and the now expanded and cooler gas is routed through stream 217 to coil 218 in the cold box, pre-cooling the high pressure gas stream in coil 205. The now warmer stream 219 enters distillation column 223 for NGL recovery. The gaseous fraction exits separator 207, through stream 208 which divides into two streams, 209 and 236. Stream 209 enters expander-compressor 210 where the high pressure gas is expanded to column 223 pressure, generating torque in shaft A, which drives booster compressor 228, and the colder gas stream exits expander-compressor 210 through stream 211 into column 223 for NGL's recovery. The NGLs are distilled, recovered and exit column 223 through line 224. The stripped gas exits column 223 through stream 225 and is pre-heated m the cold box through coil 226. The warmer gas stream 227 mixes with LNG plant section gas streams 283 and 262 before entering booster compressor 228 through stream 263.

The high pressure gaseous stream 236 is the LNG production unit section feed stream. Stream 236 enters column 237, which is a $CO_2$ stripper that controls the $CO_2$ concentration of overhead stream 238 to less than 50 ppm. The high pressure bottoms stream 265 of methanol exits stripper column 237 and is pre-heated in heat exchanger 266 and 268 before expanding through valve 270 to the operating pressure of methanol regeneration column 271. The methanol regeneration column 271 separates the stripped $CO_2$ from the methanol using heat provided by a reboiler stream 288. A slipstream of the methanol bottoms stream 272 is routed through pump 287 as reboiler stream 288, which is heated in heat exchanger 281 and returned through stream 289 to regenerator 271. The stripped $CO_2$ exits regenerator 271 through stream 280 and is cooled by air fin fan condenser 281 before entering separator 282. The condensate is returned through stream 284 and pump 285 as reflux stream 286 to control regenerator composition overhead stream 280. The stripped $CO_2$ stream 283 is routed to stream 227 to recompression into main transmission pipeline A slipstream of regenerated methanol stream 272 is routed through pump 273 and the pressurized methanol stream 274 is pre-cooled in heat exchanger 268, further cooled by an air fin-fan 276 and further cooled in heat exchanger 266. The pre-cooled methanol stream 278 is further chilled in heat exchanger 239 before entering $CO_2$ stripper 237 through stream 279. The objective of the chilled methanol stream 279 is to strip $CO_2$ from gaseous stream 236 in stripper column 237, to control the concentration of $CO_2$ m gaseous stream 238 below 50 ppm. The $CO_2$ stripped gas stream 238 exits $CO_2$ stripper column 237 and enters heat exchanger 244 where it is further cooled by gaseous cold stream 256. The high pressure, $CO_2$ stripped gas stream 245 enters separator 246 to remove the condensate fractions. The condensate stream 252 is routed to control valve 242 as a reflux stream to distillation column 223. The gaseous stream 247 enters expander-compressor 248, where it is expanded to pressures from 0-100 psig, with 10 psig being the preferred operating pressure, the expanded stream 249 enters separator 250, where the liquid fraction LNG is separated from the gaseous fraction. The torque energy generated by expander 248 is recovered and transferred by shaft B to booster compressor 261 shaft B.

The LNG stream 251 enters LNG pump 255 and is pumped to storage. The cold gaseous stream 256 exits separator 250 and is routed to heat exchanger 244, the warmer gaseous stream 257 is further heated in heat exchanger 239, exiting it through stream 258 into cold box coil 259 where it is further heated before entering booster compressor 261 through line 260. Compressor 261 is powered by torque energy recovered m expander 248 through shaft B. The boosted pressure gaseous stream 262 mixes with stream 227 and the mixed stream 263 enters booster compressor 228 where the pressure is further boosted to stream 229. Compressor 228 is powered by torque energy recovered in expander 210 through shaft A. Stream 229 gas enters main compressor 230 where the pressure is increased to transmission pipeline pressure 264, exiting the compressor and muted through heat exchanger 231 and through straddle plant block valve 232 into the transmission gas pipeline 264.

Again, the main feature of the above described process is the use of recovered energy at straddle plants to refrigerate methanol for the efficient removal of carbon dioxide in preparation of a gas stream that meets LNG product quality specifications.

The proposed main feature of using refrigerated methanol to strip $CO_2$ from hydrocarbon gaseous streams using recovered cryogenic energy addresses both large and small plants in which process simplicity and ease of operation are the main components. The refrigerated methanol will also strip other acid gases such as hydrogen sulfide that maybe present in the natural gas stream. The invention eliminates the need for refrigeration cycle plants and the use of proprietary mixed refrigerants. By simplifying the process it reduces capital, maintenance and operations costs. The objective is to provide the ability for a straddle plant to improve its economics by generating LNG in addition to NGLs using methanol to strip $CO_2$. In addition, the ratio of NGL's produced in this mode of operation to gas from the straddle plant to gas transmission pipeline is increased.

Figure 5:
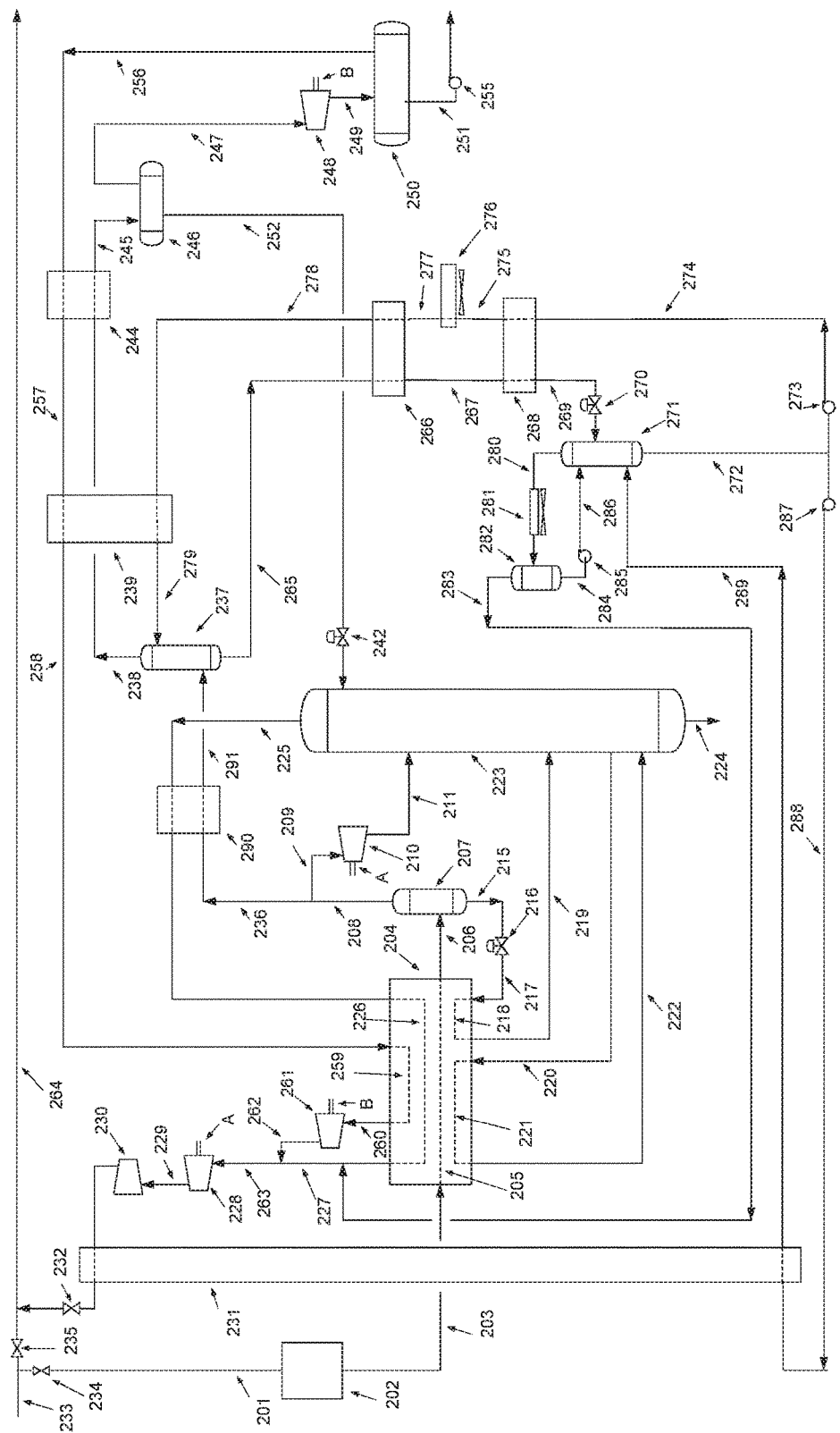
FIG. 5 is a variation of the schematic diagram of FIG. 4 where the high pressure natural gas is further cooled before entering the $CO_2$ Column Stripper.

Referring to FIG. 5, the main difference from FIG. 4 is the addition of heat exchanger 290, upstream of $CO_2$ stripper column 237 to provide additional cooling. The high pressure gaseous stream 236 enters heat exchanger 290 where it is further cooled by gaseous stream 225. The colder stream 291 enters $CO_2$ stripper column 237.

In some embodiments, a benefit of this process is the relative simplicity of the process, which eliminates the conventional use of external refrigeration systems for LNG production. Another benefit of some embodiments is the flexibility of the process to meet various operating conditions since the ratio of LNG production is proportional to the cold gaseous stream generated and returned to the transmission gas pipeline. The process may also provide for a significant savings in energy when compared to other LNG processes since the process produces its own refrigeration needs. The process may be used in any straddle plant size. A further benefit is the potential to operate at colder temperatures without an increase in refrigeration costs, which increases the effectiveness of methanol as a stripping agent. In addition, as shown in the drawings, the stream of natural gas that is to be used in generating LNG may be a slipstream of the primary stream of natural gas from the transmission pipeline after it has been cooled in a heat exchanger, and before the primary stream has been processed, whether to obtain a lower pressure suitable for a distribution network as in a pressure reduction station, or to remove natural gas liquids as in a straddle plant as the case may be. In such a case, the stream of natural gas used to produce LNG starts at a cold temperature and a high pressure, making it easier and more efficient to produce LNG.

In some embodiments, the motive force generated by the expanders may be connected to power a generator to produce electricity instead of connected to power a gas compressor as shown in the drawings.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the claims should not be limited by the preferred embodiments set forth in the examples, but should be given a broad purposive interpretation consistent with the description as a whole.

What is claimed is:

1. A method of generating liquid natural gas comprising methane from a stream of natural gas, comprising the steps of:
stripping carbon dioxide from the stream of natural gas, the carbon dioxide being stripped using the following steps:
removing water from the stream of natural gas and passing the dewatered stream of natural gas through a stripping column;
injecting a stripping agent into the stripping column, the stripping agent being substantially free of water, the stripping agent stripping carbon dioxide from the dewatered stream of natural gas and exiting the stripping column as a liquid phase;
passing the stripping agent exiting the stripping column through a regenerator column to generate a carbon dioxide gas stream and a recovered stripping agent stream;
cooling the recovered stripping agent stream using a cryogenic vapour and injecting the cooled, recovered stripping agent stream into the stripping column as the stripping agent; and
reducing a temperature and pressure of at least a portion of the stripped natural gas that exits the stripping column to produce the cryogenic vapour and a cryogenic liquid, the cryogenic vapour and the cryogenic liquid comprising methane.

2. The method of claim 1, wherein the stripping agent comprises methanol.

3. The method of claim 1, wherein the recovered stripping agent stream is cooled exclusively using cold energy from the cryogenic vapour and a group consisting of: one or more additional cooled stream of natural gas generated within the method of generating liquid natural gas, ambient air streams, one or more stripping agent streams passing between the stripping column and the regenerator column, and combinations thereof.

4. The method of claim 1, further comprising the step of passing the stripping agent through one or more heat exchangers for recovering cold energy in a regeneration circuit between the stripping column and the regenerator column.

5. The method of claim 1, further comprising the step of heating the stripping agent prior to entering the regenerator column to a temperature above the boiling point of carbon dioxide and below the boiling point of the stripping agent.

6. The method of claim 1, further comprising the step of reducing the pressure of the stripping agent exiting the stripping column prior to entering the regenerator column.

7. The method of claim 1, wherein the stripping agent additionally strips hydrogen sulfide from the natural gas stream.

8. The method of claim 1, further comprising the step of controlling a temperature within the regenerator column by circulating a portion of the recovered stripping agent stream through a heater loop that heats and returns the portion of the recovered stripping agent stream to the regenerator column.

9. The method of claim 8, wherein the heater loop recovers heat from a compressed natural gas stream exiting a natural gas compressor.

10. The method of claim 1, wherein the stream of natural gas is a slipstream of a primary natural gas stream that has been diverted from a transmission pipeline for additional processing in a plant and precooled in a heat exchanger.

11. The method of claim 10, wherein the plant is a pressure let down station and the additional processing comprises reducing the pressure of the primary natural gas stream to meet specifications of a downstream distribution pipeline.

12. The method of claim 10, wherein the plant is a straddle plant and the additional processing comprises removing natural gas liquids from the primary natural gas stream in a distillation tower.

13. The method of claim 10, further comprising the step of injecting the carbon dioxide gas stream into the transmission pipeline downstream of the plant.

* * * * *